E. GRUENFELDT.
MOTOR VEHICLE CONSTRUCTION.
APPLICATION FILED JAN. 23, 1908.
941,517.
Patented Nov. 30, 1909.
2 SHEETS—SHEET 1.
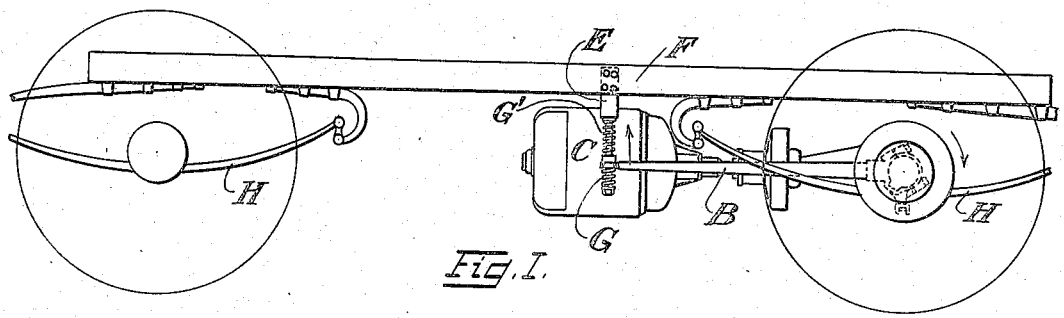
Fig. I.
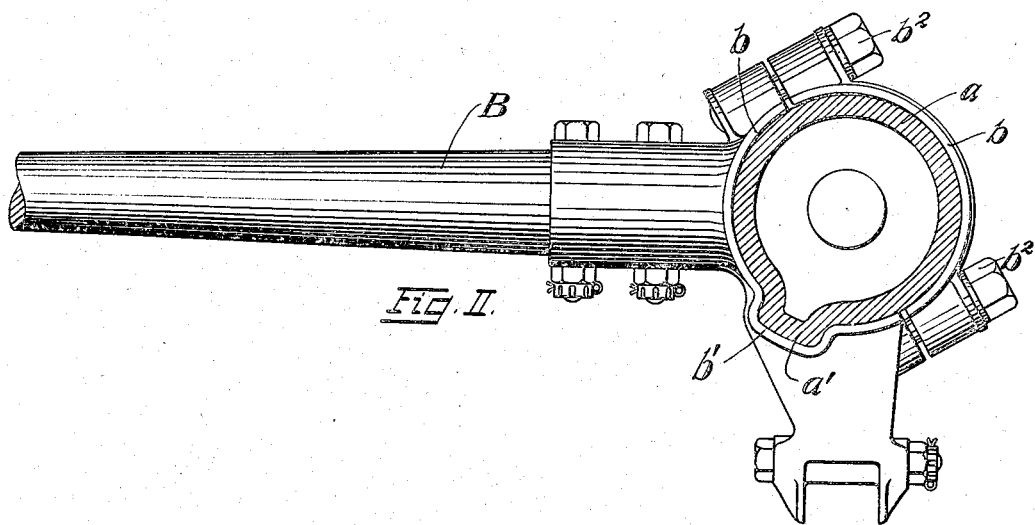
Fig. II.
Witnesses:
F. C. Valentine
Lena A. Dirlam
Inventor:
Emil Gruenfeldt
W. E. Merkel
his attorney.

E. GRUENFELDT.
MOTOR VEHICLE CONSTRUCTION.
APPLICATION FILED JAN. 23, 1908.
941,517.
Patented Nov. 30, 1909.
2 SHEETS—SHEET 2.
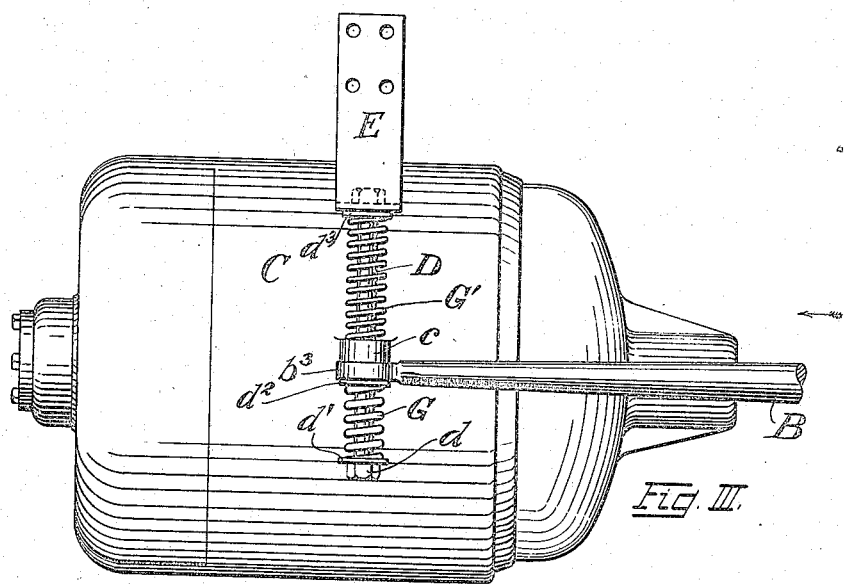
Fig. III.
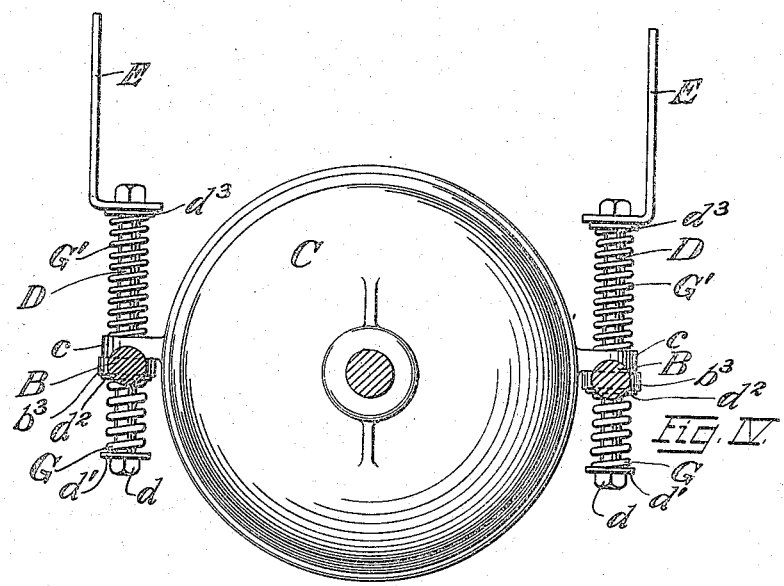
Fig. IV.
Witnesses:
F. C. Valentiner
Lena A. Dirlam
Inventor:
Emil Gruenfeldt
by N. E. Merkel
his attorney.

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

MOTOR-VEHICLE CONSTRUCTION.

941,517.     Specification of Letters Patent.     Patented Nov. 30, 1909.

Application filed January 23, 1908. Serial No. 412,235.

*To all whom it may concern:*

Be it known that I, EMIL GRUENFELDT, a subject of the Emperor of Germany, resident of Cleveland, county of Cuyahoga, and State of Ohio, have invented a new and useful Improvement in Motor-Vehicle Constructions, of which the following is a specification, the principle of the invention being herein explained and the best mode in which I have contemplated applying that principle, so as to distinguish it from other inventions.

My invention relates to motor vehicle constructions, its object being to provide an arrangement whereby shock incident to starting or stopping the vehicle or effecting a marked change in the velocity thereof, may be absorbed so as to inconvenience the occupants of the vehicle in the least possible degree.

The said invention consists of means hereinafter fully described and particularly set forth in the claims.

The annexed drawings and the following description set forth in detail, certain mechanism embodying the invention, the disclosed means constituting but one of various mechanical forms in which the principle of the invention may be applied.

In said annexed drawings:—Figure I represents a side elevation of the chassis of an electric motor vehicle of the direct drive-type, to which my invention has been applied, all parts of the vehicle which are immaterial to said invention being omitted. Fig. II represents a detail side elevation of part of the invention, upon an enlarged scale. Fig. III represents, upon an enlarged scale, a side elevation of the motor and connected parts and Fig. IV represents an end elevation viewed in the direction indicated by the arrow in Fig. III, of the parts shown in the latter.

Rigidly fixed to the sleeve $a$ of the rear axle are two arms B, Figs. I and IV, which extend forwardly and to points adjacent to opposite sides of the motor C, as shown. The rear end of each said arm is provided with a split portion $b$ which is formed with a depression $b'$ which receives an offset $a'$ formed upon the sleeve $a$. Bolts $b^2$ $b^2$ secure the arm in place upon the sleeve and in conjunction with the offset $a'$ and the depression $b'$ fix the arm and sleeve relatively to each other, as will be readily understood.

The forward end of each arm B is flattened as at $b^3$ and is formed with an eye. Each eye-portion $b^3$ is in contact with lugs $c$ respectively, formed integrally with the housing of the motor C, and each such lug is also provided with an eye, the two eyes registering with each other. Through each pair of such registering eyes passes a bolt D, such bolts being suspended respectively from hangers E which are suitably fixed, by means of bolts or rivets, to the frame F of the vehicle, as shown in Fig. I. Each such bolt projects downwardly some distance below the end of its respective arm B and is provided at its lower end with a nut $d$, as shown in Fig. III. Resting upon the nut $d$ is a washer $d'$ upon which is seated a helical spring G, the upper end of which seats against a washer $d^2$ which is in immediate contact with the part $b^3$ of the arm B, such spring surrounding the lower end of the bolt as shown. Intermediately of each lug $c$ and the hanger E is placed a second coiled spring G' surrounding the upper part of the bolt as shown, a washer $d^3$ being placed intermediate of the upper end of said spring and the hanger E. The spring G is made of heavier coils than the spring G' and is therefore considerably stiffer than the latter.

From the above construction it will be noted that the motor is supported partially by the frame of the vehicle, through the medium of the hangers, bolts and springs G, and partially by the rear axle, through the medium of the arm B.

Assuming now that the vehicle is at rest and that power is suddenly applied to the rear axle, the immediate effect will be to start the rear wheels forwardly. There being a flexible connection between the rear axle and the body of the vehicle, through the medium of the vehicle springs H H, and the vehicle body being at the moment preceding at rest, the latter will tend to remain at rest. Immediately following this condition the springs will re-act and throw the vehicle body forward thereby effecting a jolting of such body. Immediately following the sudden forward movement of the rear wheels but just prior to the time that the forward motion is transmitted to the body of the vehicle the rear axle will tend to rotate in the direction indicated by the arrow. This will cause an upward movement of the forward ends of the arms B B, which, however, will be met with the resistance exerted by the mass of the motor and by the spring G'. It will therefore be seen that the vehicle's springs will not provide all of the force necessary to transmit the motion from the wheels to the body, but that a part of the force necessary to effect such transmission will be exerted by the mass of the motor itself and by the spring G' and transmitted through the vehicle springs. Such transmission is therefore effected with less motion between the vehicle axle and the body, and the reaction of the body which effects the jolt will be considerably lessened. The motor C and the spring G' therefore constitute a shock-absorbing device wherein the weight of the motor is utilized to reduce the jolting effect of the sudden starting.

Assuming now that the vehicle is in motion and is suddenly stopped it will be seen that a reversal of the operation just described will be effected. That is, at the moment just prior to the instant of stopping, the rear axle will tend to rotate in a direction opposite that indicated by the arrow and the forward ends of the arms B B tend to move downwardly. This downward motion is, however, met and resisted by the springs G G. The weight of the motor being in this instance an ineffective factor in reducing the shock, the strength of the said spring G is such that its resisting qualities will compensate for the loss of the effect of the mass of the motor.

Other modes of applying the principle of my invention may be employed, instead of the one explained, and change may be made as regards the mechanism herein disclosed, provided the means covered by any one of the following claims be employed.

I, therefore, particularly point out and distinctly claim as my invention:—

1. In a motor vehicle construction, the combination of a vehicle frame mounted upon springs; a fixed axle member upon which said springs are mounted; a motor connected with the live member of the axle, and yieldingly supported upon said frame; and means rigidly secured to said fixed axle member and loosely connected with said motor.

2. In a motor vehicle construction, the combination of a vehicle frame mounted upon springs; an axle comprising a fixed and a live member; a motor and housing therefor yieldingly supported by said frame; and means rigidly secured to the fixed axle member, said motor housing resting loosely upon said rigidly secured means.

3. In a motor vehicle construction, the combination of a vehicle frame; a fixed axle member; an arm fixed to said axle member; a motor; yielding means supported by said frame and engaging said motor; said arm being interposed between said motor and yielding means; and additional yielding means interposed between said motor and said frame.

4. In a motor vehicle construction, the combination of a vehicle frame; an axle comprising a fixed and a live member; a motor and housing therefor, the latter provided with two laterally and oppositely disposed lugs; two arms rigidly secured to the fixed axle member, said lugs resting upon said arms; bolts suspended from the frame and passing through said lugs and arms; and springs mounted upon said bolts upon opposite sides of said lugs and arms respectively, the outer ends of said springs being in contact with fixed abutments.

Signed by me, this 21st. day of January, 1908.

EMIL GRUENFELDT.

Attested by—
Wm. Rothenberg,
Lena A. Dulane.